(12) United States Patent
Wächter et al.

(10) Patent No.: US 9,305,394 B2
(45) Date of Patent: Apr. 5, 2016

(54) SYSTEM AND PROCESS FOR IMPROVED SAMPLING FOR PARALLEL LIGHT TRANSPORT SIMULATION

(75) Inventors: Carsten Wächter, Berlin (DE); Alexander Keller, Berlin (DE)

(73) Assignee: NVIDIA CORPORATION, Santa Clara, CA (US)

( * ) Notice: Subject to any disclaimer, the term of this patent is extended or adjusted under 35 U.S.C. 154(b) by 542 days.

(21) Appl. No.: 13/463,666

(22) Filed: May 3, 2012

(65) Prior Publication Data

US 2013/0194268 A1 Aug. 1, 2013

Related U.S. Application Data

(60) Provisional application No. 61/591,801, filed on Jan. 27, 2012.

(51) Int. Cl.
G06T 15/50 (2011.01)
G06T 15/06 (2011.01)

(52) U.S. Cl.
CPC ............... *G06T 15/50* (2013.01); *G06T 15/06* (2013.01)

(58) Field of Classification Search
None
See application file for complete search history.

(56) References Cited

U.S. PATENT DOCUMENTS

| | | |
|---|---|---|
| 4,897,806 A | 1/1990 | Cook et al. |
| 5,113,493 A | 5/1992 | Crosby |
| 5,222,203 A | 6/1993 | Obata |
| 5,239,624 A | 8/1993 | Cook et al. |
| 5,289,565 A | 2/1994 | Smith et al. |
| 5,299,298 A | 3/1994 | Elmquist et al. |
| 5,357,579 A | 10/1994 | Buchner et al. |
| 5,384,667 A | 1/1995 | Beckwith |
| 5,402,534 A | 3/1995 | Yeomans |
| 5,465,119 A | 11/1995 | Demos |
| 5,684,935 A | 11/1997 | Demesa, III et al. |
| 5,729,672 A * | 3/1998 | Ashton ..................... 345/589 |
| 5,737,027 A | 4/1998 | Demos |
| 5,809,219 A | 9/1998 | Pearce et al. |
| 5,870,096 A | 2/1999 | Anjyo et al. |
| 5,973,700 A | 10/1999 | Taylor et al. |
| 5,982,385 A | 11/1999 | Fish et al. |
| 6,034,667 A | 3/2000 | Barrett |
| 6,211,882 B1 | 4/2001 | Pearce et al. |

(Continued)

FOREIGN PATENT DOCUMENTS

| | | |
|---|---|---|
| CN | 1856805 | 11/2006 |
| CN | 101599181 | 12/2009 |
| WO | WO2012115711 | 8/2012 |

OTHER PUBLICATIONS

Moller., et al., "Stochastic Rasterization Using Time-Continuous Triangles," ACM, Jan. 2007, pp. 1-11.

(Continued)

*Primary Examiner* — Kee M Tung
*Assistant Examiner* — Frank Chen (57) ABSTRACT

Embodiments of the present invention are directed to methods and a system that allow for deterministic parallel low discrepancy sampling, which can be efficiently processed, and are effective in removing transitionary artifacts that occur in low-dimensional projections generated in low discrepancy sequences. Embodiments of the claimed subject matter further provide improvements upon the low-dimensional projections and thus the visual quality when using the Sobol' sequence for image synthesis.

25 Claims, 5 Drawing Sheets

(56) References Cited

U.S. PATENT DOCUMENTS

| | | | |
|---|---|---|---|
| 6,300,956 B1 | 10/2001 | Apodaca et al. |
| 6,618,048 B1 | 9/2003 | Leather |
| 6,636,214 B1 | 10/2003 | Leather et al. |
| 6,700,586 B1 | 3/2004 | Demers |
| 6,707,458 B1 | 3/2004 | Leather et al. |
| 6,717,577 B1 | 4/2004 | Cheng et al. |
| 6,720,975 B1 | 4/2004 | Dietrich, Jr. |
| 6,811,489 B1 | 11/2004 | Shimizu et al. |
| 6,867,781 B1 | 3/2005 | Van Hook et al. |
| 6,885,384 B2 | 4/2005 | Deering et al. |
| 6,999,100 B1 | 2/2006 | Leather et al. |
| 7,002,591 B1 | 2/2006 | Leather et al. |
| 7,034,828 B1 | 4/2006 | Drebin et al. |
| 7,050,066 B2 | 5/2006 | Ohta |
| 7,061,502 B1 | 6/2006 | Law et al. |
| 7,075,545 B2 | 7/2006 | Van Hook et al. |
| 7,119,813 B1 | 10/2006 | Hollis et al. |
| 7,133,041 B2 | 11/2006 | Kaufman et al. |
| 7,133,047 B2 | 11/2006 | Pallister |
| 7,136,081 B2 | 11/2006 | Gritz et al. |
| 7,176,919 B2 | 2/2007 | Drebin et al. |
| 7,184,059 B1 | 2/2007 | Fouladi et al. |
| 7,187,379 B2 | 3/2007 | Keller |
| 7,196,710 B1 | 3/2007 | Fouladi et al. |
| 7,205,999 B2 | 4/2007 | Leather |
| 7,230,618 B2 | 6/2007 | Keller |
| 7,307,638 B2 | 12/2007 | Leather et al. |
| 7,307,640 B2 | 12/2007 | Demers et al. |
| 7,317,459 B2 | 1/2008 | Fouladi et al. |
| 7,362,332 B2 | 4/2008 | Gritz |
| 7,446,780 B1 | 11/2008 | Everitt et al. |
| 7,453,460 B2 | 11/2008 | Keller |
| 7,453,461 B2 | 11/2008 | Keller |
| 7,477,261 B2 | 1/2009 | Pallister |
| 7,483,010 B2 | 1/2009 | Bai et al. |
| 7,499,054 B2 | 3/2009 | Keller |
| 7,538,772 B1 | 5/2009 | Fouladi et al. |
| 7,576,748 B2 | 8/2009 | Van Hook et al. |
| 7,616,200 B1 | 11/2009 | Heinrich et al. |
| 7,623,726 B1 | 11/2009 | Georgiev |
| 7,697,010 B2 | 4/2010 | Pallister |
| 7,701,461 B2 | 4/2010 | Fouladi et al. |
| 7,742,060 B2 | 6/2010 | Maillot |
| 7,961,970 B1 | 6/2011 | Georgiev |
| 7,973,789 B2 | 7/2011 | Cook |
| 7,995,069 B2 | 8/2011 | Van Hook et al. |
| 8,098,255 B2 | 1/2012 | Fouladi et al. |
| 8,970,584 B1 | 3/2015 | Aila et al. |
| 2003/0083850 A1* | 5/2003 | Schmidt et al. ............... 702/189 |
| 2003/0234789 A1 | 12/2003 | Gritz |
| 2006/0101242 A1 | 5/2006 | Siu et al. |
| 2007/0046686 A1* | 3/2007 | Keller .......................... 345/581 |
| 2008/0001961 A1 | 1/2008 | Roimela et al. |
| 2008/0244241 A1 | 10/2008 | Barraclough et al. |
| 2009/0167763 A1 | 7/2009 | Waechter et al. |
| 2011/0090337 A1 | 4/2011 | Klomp et al. |
| 2012/0218264 A1 | 8/2012 | Clarberg et al. |
| 2012/0293515 A1 | 11/2012 | Clarberg et al. |
| 2012/0327071 A1 | 12/2012 | Laine et al. |
| 2013/0321420 A1 | 12/2013 | Laine et al. |

OTHER PUBLICATIONS

Hou, Q., et al, "Micropolygon Ray Tracing with Defocus and Motion Blur," ACM Transactions on Graphics (TOG), vol. 29, Article 64, Jul. 2010, pp. 1-10.

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

Tomas Akenine-Moller, Jacob Munkberg, and Jon Hasselgren, "Stochastic rasterization using time-continuous triangles," Proc. Graphics Hardware 2009.

P. Haberli and K. Akeley, "The Accumulation Buffer: Hardware Support for High Quality Rendering," in Proc. SIGGRAPH 1990. pp. 309-318.

Wang Liqing, "Research on Algorithms of Computational Geometry in GIS," China Maters Thesis Full-Text Database 2009. pp. 7-13.

McGuire, et al; "Hardware-Accelerated Global Illumination by Image Space Photon Mapping", HPG 2009, New Orleans, Louisiana, Aug. 1-3, 2009.

Linsen, et al; "Splat-based Ray Tracing of Point Clouds", Journal of WSCG 15: 51-58, 2007.

Schaufler, et al; "Ray Tracing Point Sampled Geometry", In Proceedings of the Eurographics Workshop on Rendering Techniques 2000, p. 319-328, London, UK, 2000. Springer-Verlag.

* cited by examiner

Exemplary Computer System 400

SYSTEM AND PROCESS FOR IMPROVED SAMPLING FOR PARALLEL LIGHT TRANSPORT SIMULATION

CLAIM OF PRIORITY

This application claims priority to provisional patent application Ser. No. 61/591,801, filed Jan. 27, 2012, and which is hereby incorporated by reference.

BACKGROUND

Graphical rendering is the computer implemented process of generating images from simulated models in a scene, and is typically performed by software executed by one or more processors in a computing system. Of paramount importance in proper graphical rendering is effectively representing the behavior of light in the generated images. As such, various techniques have been developed to accurately and efficiently simulate the transport of light within the field of computer graphics rendering. Conventionally, the transportation of light may be simulated by light transport simulation engines, consisting of software and/or hardware that may employ one or more modeling techniques to model the behavior of light particles in an image.

One such modeling technique is known as ray tracing, which aims to simulate the natural flow of light, interpreted as particles, by tracing rays in light transport paths. Often, ray tracing methods involve using a class of numerical algorithms known as Monte Carlo methods that rely on repeated random sampling to compute their results. Even more recently, sampling techniques using low discrepancy sequences have been developed which are often preferred over random sampling, as they ensure a more uniform coverage and normally have a faster order of convergence than simulations using random or pseudorandom sequences (such as simulations generated using Monte Carlo methods). Methods based on low discrepancy sequences are known as quasi-Monte Carlo methods, and applications involving such methods are known as quasi-Monte Carlo applications.

A particular application of ray tracing is known as path tracing, which attempts to simulate the physical behavior of light as accurately as possible. One such path tracing technique utilizes "Sobol' sequences" (also called (t, s)-sequences in base 2), a widely used low discrepancy sequence in quasi-Monte Carlo applications. These sequences use a base of two to form successively finer uniform partitions of the unit interval, and then reorder the coordinates in each dimension.

According to a popular technique of path tracing, sampled points are created by exploiting the stratification properties of the Sobol' sequence and transforming the points accordingly. While its construction is very efficient, it is known that low-dimensional projections of the Sobol' points can reveal correlation patterns, especially for rather small subsets of the sequence. Applied to problems with low-dimensional structure, such as light transport simulation, these correlation patterns can unfortunately become visible as transitionary but distracting artifacts, particularly during progressive simulation. While it is guaranteed that the artifacts vanish, they do so slowly. These problems are due to correlations in low-dimensional projections of the Sobol' sequence. Although considerable research and effort has been dedicated to improving the Sobol' sequence, issues in light transport simulation remain.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and systems that allow for deterministic parallel low discrepancy sampling, which can be efficiently processed, and are effective in removing transitionary artifacts that occur in low-dimensional projections generated in low discrepancy sequences for computer-implemented graphics rendering processes and systems. Embodiments of the present invention further provide improvements upon the low-dimensional projections and thus the visual quality when using the Sobol' sequence for image synthesis. The claimed embodiments not only preserve the advantages of deterministic parallelization, but improve upon the performance and simplicity of sampling as well, by avoiding most of the matrix multiplications encountered with the original Sobol' sequence.

According to an embodiment, a method is provided which applies scrambling to randomize sets of enumerated points for sampling within a computer graphics system or method of rendering. According to an embodiment, scrambling of a point set is performed with permutation polynomials. In further embodiments, the permutation polynomials may consist of quadratic permutation polynomials. Correlation artifacts that would typically arise from the application of the Sobol' sequence are removed by the scrambling according to these embodiments.

According to another embodiment, a method is provided which uses rank-1 lattices wherein the second component of the rank-1 lattice sequence is scrambled such that the component coincides with the radical inverse of a Sobol' sequence. The method may be used within computer implemented graphics rendering systems or methods of rendering. As scrambling a point set does not affect its order of convergence, the above algorithm converges for suitable choices of a generator vector. Improved images may be rendered using a two-dimensional Sobol' sequence provided by such an embodiment to sample an image plane. Further dimensions of an image plane sample may be determined by components of a rank-1 lattice sequence.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Specifically, portions of the detailed description that follow are presented and discussed as mathematical formulas. These formulas are provided for illustrative purposes, and it is understood that the claimed subject matter is not limited to these formulas, and that embodiments are well suited to alternate expression.

Portions of the detailed description that follow are also presented and discussed in terms of a process. Although steps and sequencing thereof are disclosed in figures herein (e.g., FIGS. 1-3) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Improved Low Discrepancy Sampling

Embodiments of the present invention are directed to provide methods that allow for deterministic parallel low discrepancy sampling, which can be processed efficiently, and are effective in removing transitionary artifacts that occur when sampling low-dimensional projections of low discrepancy sequences. The claimed subject matter not only preserves the advantages of deterministic parallelization, but improves upon the performance and simplicity of sampling as well, by avoiding most of the matrix multiplications encountered with the Sobol' sequence. Embodiments of the present invention and their benefits are further described below.

The embodiments of the present invention, as described herein, is based on the concept of elementary intervals and the Sobol' sequence. As recited herein, the Sobol' sequence may comprise a (t,s)-sequence, which in turn may be a sequence of (0 μm,s)-nets.

As recited herein, an elementary interval in base b may be expressed as an interval of the form $$E(p_1, \ldots, p_s) := \prod_{j=1}^{s} [p_j b^{-d_j}, (p_j+1)b^{-d_j}) \subseteq [0, 1)^s$$

for $0 \leq p_j < b^{d_j}$ and integers $d_j \geq 0$.

As recited herein, for integers $0 \leq t \leq m$, a (t, m, s)-net in base b may comprise a point set of $b^m$ points in $[0, 1)^s$ such that there may be exactly $b^t$ points in each elementary interval E with volume $b^{t-m}$.

As recited herein, for an integer $t \geq 0$, a sequence $\vec{x}_0$, $x_t, \ldots$ of points $[0, 1)^s$ is a (t, s)-sequence in base b if, for all integers $k \geq 0$ and $m > t$, the point set $\vec{x}_{kb^m}, \ldots, \vec{x}_{(k+1)b^m-1}$ is a (t, m, s)-net in base b.

Sample Point Processing

Figure 1:
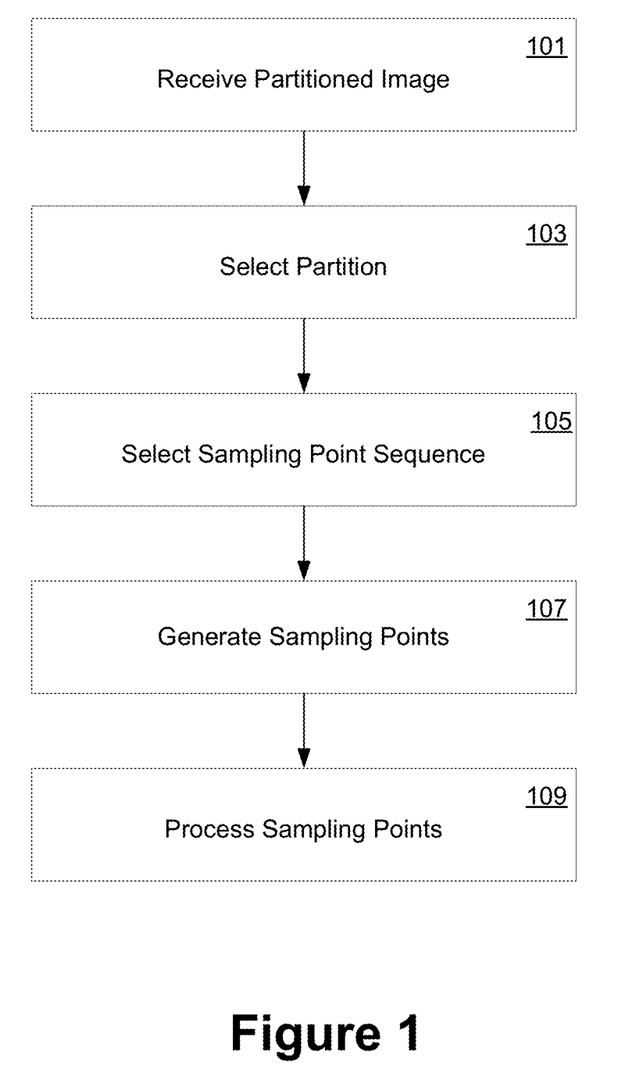
FIG. 1 depicts a flowchart of an exemplary computer-implemented process for processing sampled points in an image plane, in accordance with various embodiments of the present invention.

FIG. 1 depicts a flow diagram 100 of a process for processing sampled points in an image plane within a graphics rendering system. Steps 101-109 describe exemplary steps comprising the process 100 depicted in FIG. 1 in accordance with the various embodiments herein described. In one embodiment, the process 100 is implemented in whole or in part as computer-executable instructions stored in a computer-readable medium and executed in a computing device. In still further embodiments, process 100 may be performed during a graphics rendering process, performed by a rendering engine executed by a processor, such as a graphics processing unit (GPU).

At step 101 of FIG. 1, a partitioned image plane is received. In one embodiment, the image plane is partitioned into a plurality of partitions, each partition comprising a plurality of points of data. In one embodiment, the image plane may be generated by, and received from, a graphical rendering engine, for example. At step 103, one or more partitions of the plurality of partitions in the image plane are selected for sampling. This selection may be automated, and performed by the graphical rendering engine.

At step 105 of FIG. 1, a sampling point sequence is elected from a plurality of sampling point sequences to be used for generating sampling points from the data comprised in the partition selected at 103. In one embodiment, the sampling point sequence may be elected from a scrambled point sequence or a hybrid point sequence that combines a (t,s)-sequence (such as a Sobol' sequence) and a rank-1 lattice sequence. Electing the sampling point sequence may be performed automatically, e.g., one sequence may be automatically selected over the other. Alternatively, the sampling point sequence may be randomly selected, or manually (pre)-configured. In still further embodiments, both sampling point sequences may be used to generate sampling points from one or more partitions of the plurality of partitions in the image plane.

At step 107, sampling points for the partition(s) are generated according to the sampling point sequence(s) elected at step 105. In one embodiment, these sampled points may be generated according to a scrambled (t,s)-sequence, or a hybrid sequence combining a (t,s)-sequence with a lattice sequence, or both. Finally, at step 109, the generated sampling points are processed. Processing the generated sampling points may be performed in parallel for multiple partitions, using the same or a different sampling point sequence. Processing the generated sampling points may be used to trace a transport path of a light particle during light transport simulation performed during graphical rendering, for example.

Scrambled Low Discrepancy Sequence

Figure 2A:
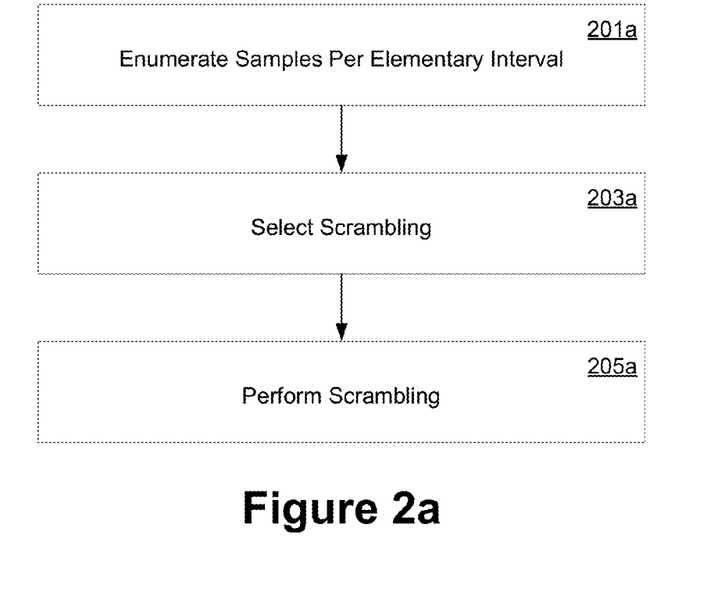
FIG. 2a depicts a flowchart of a first exemplary sample point sequence performed in a computer-implemented process for processing sampled points in an image plane, in accordance with various embodiments of the present invention.

FIG. 2a depicts a flow diagram of a scrambled point sequence performed in a process for processing sampled points in an image plane. Steps 201a-205a describe exemplary steps, which may be performed during step 107 of process 100, and depicted in FIG. 1. In further embodiments, steps 201a-205a may be performed during the election, at step 105, of a scrambled point sequence to be used for generating sampling points in a partition.

At step 201a, data points in the partition are enumerated as sample points. Enumeration may be performed by, for example, using a quasi-random low discrepancy sequence, such as a (t,s)-sequence in base b. In one embodiment, a Sobol' sequence is the quasi-random low discrepancy sequence used. At step 203a, a scrambling method is selected. In one embodiment, the scrambling method may be selected from a plurality of scrambling methods, either automatically (e.g., as a default, randomly, or according to a heuristic), or manually (e.g., pre-configured).

Finally, at step 205a, the sampling points enumerated at step 201a are scrambled according to the scrambling method selected at step 203a. Scrambling may be performed according to a variety of scrambling methods (a plurality of which may be selected from at step 203a), depending on the particular embodiment. An exemplary process for scrambling is described below with respect to FIG. 3.

Hybrid (T, S)- and Rank-1 Lattice Sequences

Figure 2B:
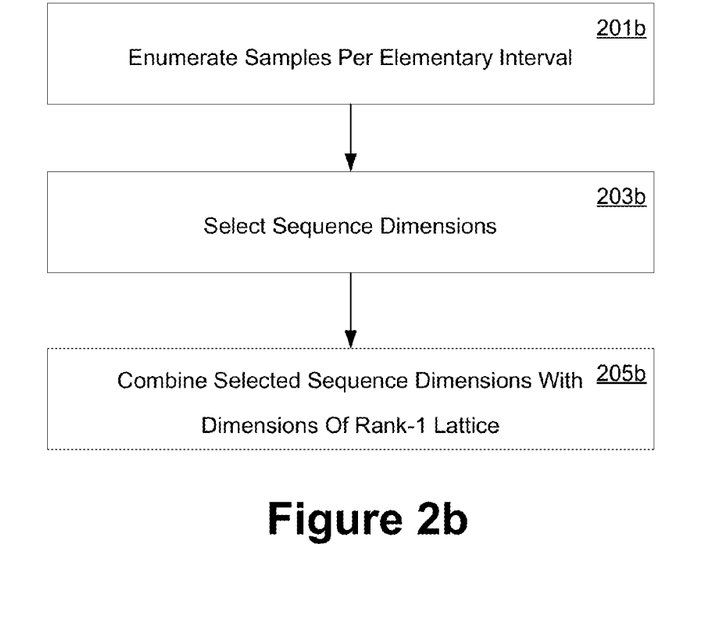
FIG. 2b depicts a flowchart of a second exemplary sample point sequence performed in a computer-implemented process for processing sampled points in an image plane, in accordance with various embodiments of the present invention.

FIG. 2b depicts a flow diagram of a hybrid point sequence performed in a process for processing sampled points in an image plane. In an embodiment, rank-1 lattices and rank-1 lattice sequences may be added to previously described embodiments as the hybrid point sequence to combine the advantages of enumerating (t, s)-sequences in elementary intervals with the efficient generation of rank-1 lattice sequences. Steps 201b-205b describe exemplary steps which may be performed during step 107 of process 100, and depicted in FIG. 1. In further embodiments, steps 201b-205b may be performed during the election, at step 105, of a hybrid point sequence to be used for generating sampling points in a partition.

At step 201b, data points in the partition are enumerated as sample points. Enumeration may be performed by, for example, using a quasi-random low discrepancy sequence, such as a (t, s)-sequence in base b. In one embodiment, a Sobol' sequence is the quasi-random low discrepancy sequence used. At step 203b, one or more dimensions of the quasi-random low discrepancy sequence used in step 201b is selected. In the foregoing examples, a low discrepancy sequence is provided for illustrative purposes. As described below, the low discrepancy sequence may comprise a two-dimensional Sobol' sequence. Finally, at step 205b, a path of the sampled points enumerated at step 201b by the quasi-random low discrepancy sequence may be traced by sampling dimensions of the path using a rank-1 lattice sequence.

In one embodiment, the n points $x_i$ of an s-dimensional rank-1 lattice may be expressed as:

$$L_{n,g}\left\{x_i := \frac{i}{n}g \bmod 1 : i = 0, \ldots, n-1\right\} \subset [0, 1)^s$$

and may be generated by a suitable vector $g \in \mathbb{N}^s$. In one embodiment, Rank-1 lattices $L_{n,a}$ may be expressed in Korobov form, and use generator vectors of the restricted form $g=(1, a, a^2, \ldots a^{s-1})$.

A rank-1 lattice may be extended to a rank-1 lattice sequence by replacing the fraction i/n the rank-1 lattice with a radical inverse sequence (e.g., a van der Corput sequence) $\Phi_b$ in base b. From this, the rank-1 lattice sequence may be expressed as:

$$L_g^{\Phi_b} := \{x_i := \Phi_b(i) \cdot g \bmod 1 : i \in \mathbb{N}_0\} \subset [0,1)^s$$

in the sense that for any $m \in \mathbb{N}_0$ the first $b^m$ points $x_0, \ldots, x_{b^m-1}$ are a rank-1 lattice $L_{b^m,g}$. Thereby the radical inverse sequence $\Phi_b$ mirrors the b-ary representation of an integer i at the decimal point $$\Phi_b(i): \mathbb{N}_0 \to \mathbb{Q} \cap [0,1)$$

$$i = \sum_{j=0}^{\infty} a_j(i) b^j \to \sum_{j=0}^{\infty} a_j(i) b^{-j-1}$$

where $a_j(i)$ denotes the j-th digit of the integer i represented in base b.

In an embodiment, an improved image may be rendered using the two-dimensional Sobol' sequence $(\Phi_2(i), \Phi_{Sob}(i))$ to sample the image plane. All further dimensions of an image plane sample may be calculated as the components $\Phi_2(i)g_j$ mod 1 of a rank-1 lattice sequence, such as the above provided example. The improvements over the conventional Sobol' sequence manifest in the disappearance of correlation artifacts. Except for the second dimension, these points coincide with a rank-1 lattice sequence as defined above.

In one embodiment, $\Phi_b$ is a (0, 1)-sequence and each contiguous block of $b^m$ points is a (0, m, 1)-net in base b. As a consequence, the integer parts of such a (0, m, 1)-net multiplied by b are a permutation. If now b and $g_j$ are relatively prime, then for such a (0, m, 1)-net the integers $g_j \lfloor b^m \Phi_b(i) \rfloor$ mod $b^m$ mod form a permutation, too. Hence $\Phi_b(i)g_j$ mod 1 is a (0, 1)-sequence in base b. Therefore a permutation exists that maps the elements of any (0, m, 1)-net of $\Phi_2(i)g_j$ to $\Phi_{Sob}(i)$ and consequently $\Phi_{Sob}(i)$ and $\Phi_2(i)g_j \bmod 1$ are scrambled versions of each other.

The above expression thus uses a rank-1 lattice sequence, whose second component is scrambled such that it coincides with the radical inverse according to a Sobol' sequence. As scrambling a point set does not affect its order of convergence, the above algorithm converges for suitable choices of the generator vector g. As provided, any component $\Phi_b(i)g_j \bmod 1$ of a rank-1 lattice sequence is a (0, 1)-sequence, if b and $g_j$ are relatively prime. As a consequence, any number of dimensions of a (t, s)-sequence in base b, whose components are (0, 1)-sequences can be combined with any number of dimensions of a rank-1 lattice sequence as long as b and $g_j$ are relatively prime. It therefore is possible to reduce the sampling rate of any component by a factor of $b^m$ by just using an index of the form $\lfloor i/b^m \rfloor$ instead of i.

For a simple example from image synthesis by path tracing, $$\int_{[0,1]^s} f(\vec{x}, t) dt dx = $$

$$\lim_{n \to \infty} \frac{1}{n} \sum_{i=0}^{n-1} f(\Phi_2(i), \Phi_{Sob}(i), \Phi_2(\lfloor i/2^m \rfloor)a^2 \bmod 1, \Phi_2(i)a^3 \bmod 1,$$

$$\ldots, \Phi_2(i)a^s \bmod 1)$$

The above example uses the Sobol' sequence for sampling the image plane, samples the time by $\Phi_2(\lfloor i/2^m \rfloor) a^2 \bmod 1$ using a factor of $2^m$ less instants in time than path samples, and samples the remaining dimensions of a path using a rank-1 lattice sequence.

The components of each point of the sequence can be considered elements from a linear congruential pseudo-random number generator. The ensemble of all points according to such an approach is deterministic and can achieve low discrepancy, while conventional hybrid sequences typically relied on random numbers that cannot achieve such a level of uniformity and thus potentially converge slower.

Finally, the example emphasizes the increased processing efficiency, because instead of computing matrix vector products for digital sequences, only one multiplication and modulo operation is required to compute the next component of a point. In addition, the hybrid sequences can be augmented by scrambling as described above.

In the rendering application as described above with respect to FIG. 2, a two-dimensional Sobol' sequence is used to sample an image plane. Compared to a conventional Sobol' sequence in two dimensions, there exist much more uniform point sets. However, the two-dimensional Sobol' points are unique (up to their order of enumeration). Therefore improvements cannot rely on the digital construction and must use more general permutations: It is known that scrambling very often improves the uniformity of digital (t, s)-sequences and in fact such permutation based constructions are provided by the claimed subject matter.

Point Sequence Scrambling

Figure 3:
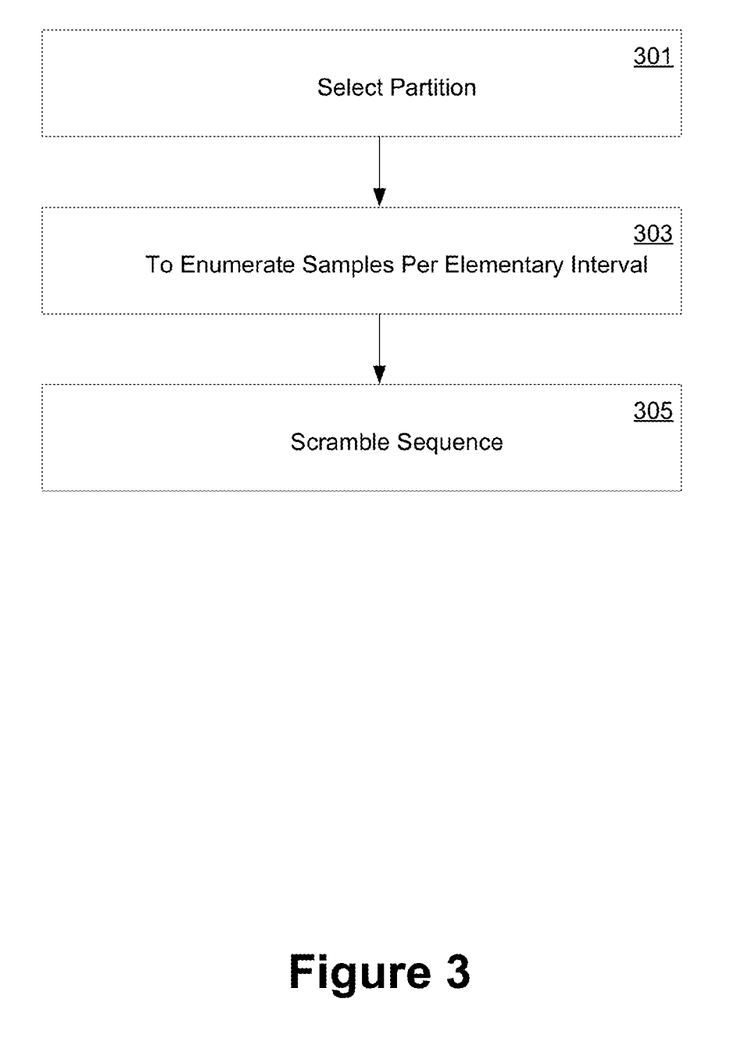
FIG. 3 depicts a flowchart of an exemplary scrambling computer-implemented process performed for a sample point sequence, in accordance with various embodiments of the present invention.

FIG. 3 depicts a flow diagram of a scrambling process performed on a sample point sequence, in accordance with embodiments of the claimed subject matter. Steps 301-305 describe exemplary steps which may be performed during step 205a described above and depicted in FIG. 2a.

As recited, steps 301-305 describe exemplary steps for scrambling points in a volume $H=[0, 1)^s$, along each spatial dimension. At step 301, the volume H is partitioned into b equal volumes $H_1, H_2, \ldots, H_b$ along the current coordinate.

At step 303, the volumes are permuted. Finally, at step 305, for each volume $H_h$ the procedure using $H=H_h$ is recursively repeated. Due to the finite precision of computer arithmetic, the scheme becomes finite and for M digits the algorithm can be expressed as follows:

Given the j-th component $U_i^{(j)} = {_b}0. u_{i,1}^{(j)} u_{i,2}^{(j)} \ldots u_{i,M}^{(j)}$ of the i-th point of a point sequence, its scrambled version $V_i^{(j)} = {_b}0. v_{i,1}^{(j)} v_{i,2}^{(j)} \ldots v_{i,M}^{(j)}$ is determined by applying permutations to the digits $$v_{i,1}^{(j)} := \pi_i^{(j)}(u_{i,1}^j)$$

$$v_{i,2}^{(j)} := \pi_{u_{i,1}^j}^{(j)}(u_{i,2}^j)$$

$$\vdots$$

$$v_{i,M}^{(j)} := \pi_{u_{i,1}^j, u_{i,2}^j, \ldots, u_{i,M-1}^j}^{(j)}(u_{i,M}^j)$$

where the k-th permutation from the symmetric group $S_b$ of all permutations over the set $\{0, \ldots, b-1\}$ depends on the k−1 leading digits of $u_{i,k}^{(j)}$. The mapping is bijective on $[0, 1) \cap \mathbb{Q}$, because the inverse $u_{i,k}^{(j)}$ of any $v_{i,k}^{(j)}$ found by recursively computing $u_{i,k}^{(j)} = (\pi_{u_{i,1}^j, \ldots, u_{i,k-1}^{(j)}}^{(j)})^{-1}(v_{i,k}^{(j)})$.

Scrambling has been used conventionally to randomize point sets in order to allow for variance estimation. Conventional scrambling implementations often rely on explicitly storing permutations or scrambling matrices. According to embodiments of the claimed subject matter, however, scrambling permutations π by permutation polynomials are used instead. According to an embodiment, a polynomial may be expressed as:

$$g \in F_q[x] : F_q \to F_q$$

$$n \to y_n := g(n)$$

and is a permutation polynomial of $F_q$, if $\{y_0, y_1, \ldots, y_{q-1}\} = F_q$.

Improvements to a synthesized image may be established by sampling the image with a Sobol' sequence and using a permutation polynomial to compute $\pi^{(j)}$, while $v_{i,k}^{(j)} = u_{i,k}^{(j)}$ for k>1. In further embodiments, the permutation polynomials may be implemented as quadratic permutation polynomials on $F_q$ for q being a power of 2. The correlation artifacts are removed by scrambling, while the t parameter and thus the order of convergence remain invariant.

Exemplary Computing Device

Figure 4:
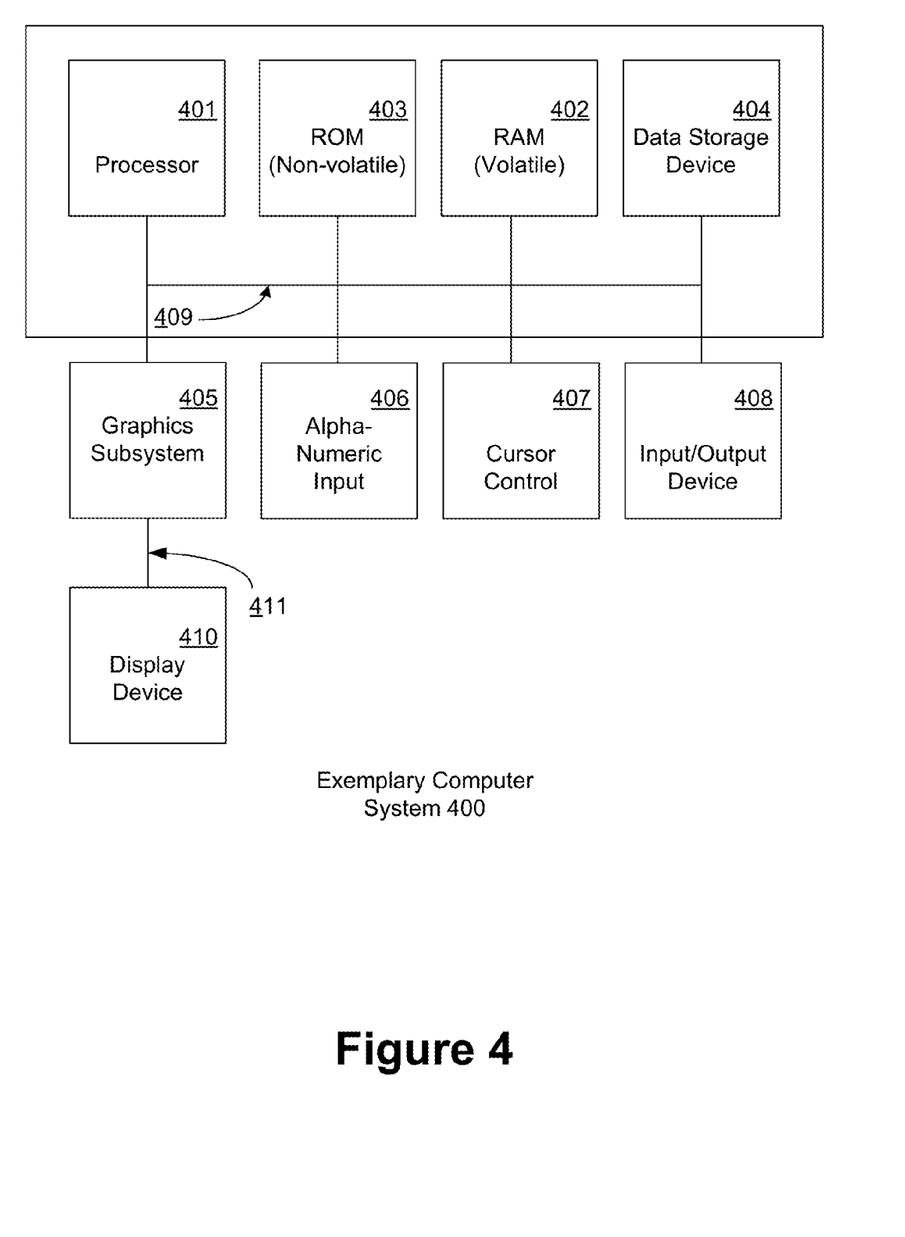
FIG. 4 depicts a block diagram of a general purpose computer system, upon which embodiments of the present invention may be implemented and/or performed.

As presented in FIG. 4, an exemplary system for implementing embodiments includes a general purpose computing system environment, such as computing system 400. In its most basic configuration, computing system 400 typically includes at least one processing unit 401 and memory, and an address/data bus 409 (or other interface) for communicating information. Depending on the exact configuration and type of computing system environment, memory may be volatile (such as RAM 402), non-volatile (such as ROM 403, flash memory, etc.) or some combination of the two. The processing units may be reconfigurable devices, such as one or more field-programmable gate arrays (FPGAs).

Computer system 400 may also comprise an optional graphics subsystem 405 for presenting information to the computer user, e.g., by displaying information on an attached display device 410, connected by a video cable 411. Graphics subsystem 405 may execute a computer graphics rendering engine, such as a light transport simulation engine, used to perform one or more of the processes described above with respect to FIGS. 1-3. In alternate embodiments, display device 410 may be integrated into the computing system (e.g., a laptop or netbook display panel) and will not require a video cable 411. In one embodiment, process 400 may be performed, in whole or in part, by graphics subsystem 405 and memory 402, with any resulting output displayed in attached display device 410.

Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by data storage device 404. Computer storage media includes volatile and nonvolatile, removable and non-removable media implemented in any method or technology for storage of information such as computer readable instructions, data structures, program modules or other data. RAM 402, ROM 403, and data storage device 404 are all examples of computer storage media.

Computer system 400 also comprises an optional alphanumeric input device 406, an optional cursor control or directing device 407, and one or more signal communication interfaces (input/output devices, e.g., a network interface card) 408. Optional alphanumeric input device 406 can communicate information and command selections to central processor 401. Optional cursor control or directing device 407 is coupled to bus 409 for communicating user input information and command selections to central processor 401. Signal communication interface (input/output device) 408, also coupled to bus 409, can be a serial port. Communication interface 409 may also include wireless communication mechanisms. Using communication interface 409, computer system 400 can be communicatively coupled to other computer systems over a communication network such as the Internet or an intranet (e.g., a local area network), or can receive data (e.g., a digital television signal).

Exemplary Visual Comparison

Figure 5A:
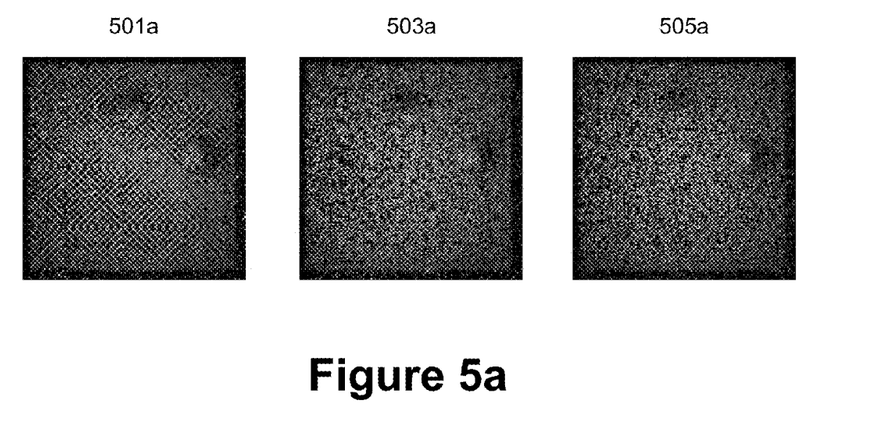
FIG. 5a depicts an exemplary graphical output generated with path tracing using the respective point sequences at an earlier time in a progression, in accordance with various embodiments of the present invention
Figure 5B:
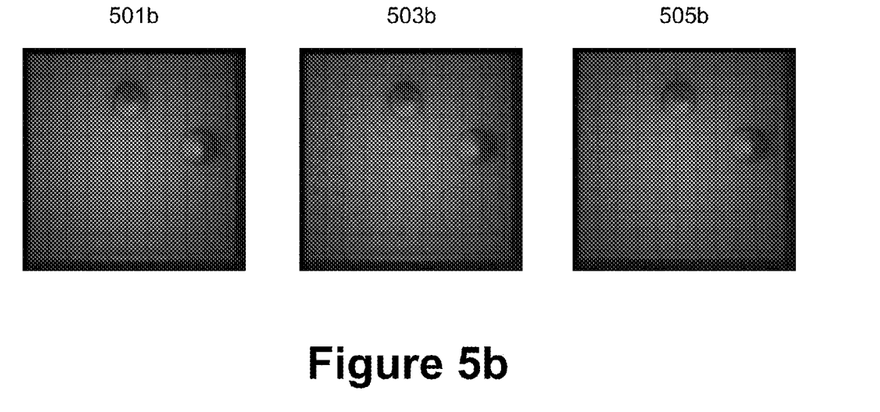
FIG. 5b, depicts an exemplary graphical output generated with path tracing using the respective point sequences at a later time in the progression, in accordance with various embodiments of the present invention.

As presented in FIGS. 5a and 5b, exemplary graphical comparison of progressive path tracing using a traditional Sobol' sequence (501a, 501b), a scrambled Sobol' sequence using quadratic permutation polynomials according to embodiments of the present invention (503a, 503b), and a hybrid sequence comprising the Sobol' sequence extended by a rank-1 lattice sequence according to embodiments of the present invention (505a, 505b). FIG. 5a depicts the path tracing using the respective point sequences at an earlier time in the progression. FIG. 5b, meanwhile, depicts the path tracing using the respective point sequences at a later time in the progression. As presented in FIG. 5a, transitionary structure artifacts that occur earlier during sampling under the traditional Sobol' sequence (501a) are replaced by noise in both the scrambled Sobol' sequence using quadratic permutation polynomials (503a) and the hybrid sequence comprising the Sobol' sequence extended by a rank-1 lattice sequence (505a) at the same, respective time. As presented in FIG. 5b, the hybrid (505b) and scrambled sequences (503b) achieve approximately the same performance later in the progression as the traditional Sobol' sequence (501b), which still exposes the structured artifacts, as the schemes converge to the same.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for simulating light transport in a computer graphics system, the method comprising:
   selecting a partition from a plurality of partitions;
   selecting a low discrepancy sequence corresponding to the selected partition;
   generating a plurality of sampling points comprised in the partition based on the low discrepancy sequence; and
   processing the plurality of sampling points,
   wherein generating the plurality of sampling points comprises reducing the rate of sampling used during the generating based on the low discrepancy sequence,
   further wherein the low discrepancy sequence comprises a (t, s)-sequence in base b.

2. The method according to claim 1, wherein the low discrepancy sequence comprises inherent stratification properties.

3. The method according to claim 1, wherein the (t, s)-sequence in base b comprises at least one of:
   a Sobol' sequence;
   a Niederreiter sequence; and
   a Faure sequence; and
   a Niederreiter-Xing sequence.

4. The method according to claim 1, wherein the low discrepancy sequence comprises applying deterministic scrambling to the (t, s)-sequence in base b.

5. The method according to claim 4, wherein the deterministic scrambling comprises the application of permutation polynomials.

6. The method according to claim 5, wherein the permutation polynomials comprise quadratic permutation polynomials.

7. The method according to claim 1, wherein the plurality of sampling points comprise a plurality of components of a (0, 1)-sequence in base b.

8. The method according to claim 1, wherein the a rate of sampling is reduced by a factor of $b^m$.

9. The method according to claim 1, wherein the sampling a set of the partition based on the low discrepancy sequence is performed in parallel.

10. The method according to claim 1, wherein the low discrepancy sequence comprises a hybrid sequence comprising a plurality of samples enumerated by using a (t, s)-sequence and selected from a plurality of dimensions of the (t, s)- by using a rank-1 lattice sequence.

11. The method according to claim 10, wherein the sampling a set of the partition based on the low discrepancy sequence to select a plurality of components comprises reducing a rate of the sampling by a factor of $b^m$.

12. The method according to claim 11, wherein a generator vector of the rank-1 lattice sequence comprises a Korobov form rank-1 lattice sequence.

13. A non-transitory computer readable medium containing program instructions embodied therein for causing a computer graphics system to simulate the transportation of light, the program instructions comprising:
   instructions to select a partition from a plurality of partitions;
   instructions to select a low discrepancy sequence corresponding to the selected partition;
   instructions to generate a plurality of sampling points comprised in the partition based on the low discrepancy sequence; and
   instructions to process the plurality of sampling points,
   wherein a rate of sampling corresponding to the instructions to generate the plurality of sampling points is reduced based on the low discrepancy sequence.

14. The non-transitory computer readable medium according to claim 13, wherein the low discrepancy sequence comprises a (t, s)-sequence in base b.

15. The non-transitory computer readable medium according to claim 14, wherein the (t, s)-sequence in base b comprises at least one of:
   a Sobol' sequence;
   a Niederreiter sequence;
   a Faure sequence; and
   a Niederreiter-Xing sequence.

16. The non-transitory computer readable medium according to claim 13, wherein the low discrepancy sequence comprises applying deterministic scrambling to the (t, s)-sequence in base b.

17. The non-transitory computer readable medium according to claim 13, wherein the deterministic scrambling comprises the application of permutation polynomials.

18. The non-transitory computer readable medium according to claim 17, wherein the permutation polynomials comprise quadratic permutation polynomials.

19. The non-transitory computer readable medium according to claim 13, wherein selected components of the low discrepancy sequence comprise (0, 1)-sequences in base b.

20. The non-transitory computer readable medium according to claim 13, wherein the instructions to process the plurality of sampling points are performed in parallel.

21. The non-transitory computer readable medium according to claim 13, wherein the low discrepancy sequence comprises a hybrid sequence comprising a plurality of samples enumerated by using a (t, s)-sequence and selected from a plurality of dimensions of the (t, s)- by using a rank-1 lattice sequence.

22. A computer system comprising:
   a computer readable medium coupled to said processor and containing program instructions responsive to execution by the processor to implement sampling of for parallel light transport simulation, the program instructions comprising:
   instructions to select a partition from a plurality of partitions;
   instructions to select a low discrepancy sequence corresponding to the selected partition;
   instructions to generate a plurality of sampling points comprised in the partition based on the low discrepancy sequence; and
   instructions to process the plurality of sampling points,
   wherein a rate of sampling corresponding to the instructions to generate the plurality of sampling points is reduced based on the low discrepancy sequence.

23. The computer system according to claim 22, wherein the low discrepancy sequence comprises a (t, s)-sequence in base b.

24. The computer system according to claim 22, wherein the instructions to process the plurality of sampling points are performed in parallel.

25. The computer system according to claim 22, wherein the low discrepancy sequence comprises a hybrid sequence comprising a plurality of samples enumerated by using a (t, s)-sequence and selected from a plurality of dimensions of the (t, s)- by using a rank-1 lattice sequence.

* * * * *